United States Patent [19]

Potochnik et al.

[11] Patent Number: 4,590,329

[45] Date of Patent: May 20, 1986

[54] PROTECTIVE ENCLOSURE FOR SPLICE CONNECTION

[75] Inventors: Lawrence M. Potochnik, Washington Township, Washington County; Kenneth F. Semethy, N. Versailles, both of Pa.

[73] Assignee: Westinghouse Electric Corp., Pittsburgh, Pa.

[21] Appl. No.: 692,948

[22] Filed: Jan. 18, 1985

[51] Int. Cl.[4] .............................................. H02G 15/08

[52] U.S. Cl. ...................................... 174/88 R; 174/76

[58] Field of Search ....................... 174/84 R, 88 R, 76

[56] References Cited

U.S. PATENT DOCUMENTS

| | | | |
|---|---|---|---|
| 2,030,080 | 2/1936 | Waldron | 174/84 R |
| 2,058,929 | 10/1936 | Vietzen | 174/88 R |
| 2,352,159 | 6/1944 | Brodie | 174/88 R |
| 2,635,975 | 4/1953 | Peters | 174/84 R |
| 3,013,108 | 12/1961 | Sweeney | 174/88 R |
| 3,187,088 | 6/1965 | Warner | 174/84 R |
| 4,152,538 | 5/1979 | Gassinger et al. | 174/76 X |
| 4,271,329 | 6/1981 | Perelmuter | 174/84 R |
| 4,375,720 | 3/1983 | Bourget | 174/88 R X |

FOREIGN PATENT DOCUMENTS

| | | | |
|---|---|---|---|
| 1327305 | 8/1973 | United Kingdom | 174/76 |
| 2105119 | 3/1983 | United Kingdom | 174/84 R |

*Primary Examiner*—Arthur T. Grimley
*Assistant Examiner*—Morris H. Nimmo
*Attorney, Agent, or Firm*—Daniel C. Abeles

[57] ABSTRACT

A protective enclosure for a splice connection between respective conductors of a hardline cable having a rigid sheath and a softline cable having a flexible sheath, each conductor including a conductive wire and a layer of insulation enclosing the wire, with one wire of the hardline cable being electrically connected to a corresponding wire of the softline cable by a connector located in a splice region, the enclosure including: cover elements extending between, and secured to, the cable sheaths and including a flexible metal tube enclosing the splice region; and a mass of flexible potting material filling the splice region for isolating the connector and the wires connected thereby from the external environment.

5 Claims, 1 Drawing Figure

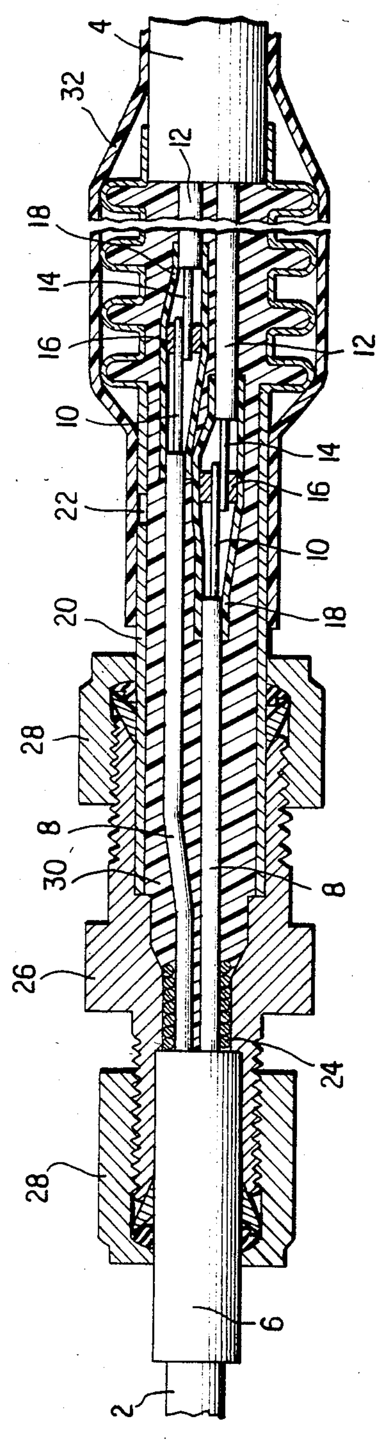
4
32
12
18
14
16
12
10
14
16
22
10
20
18
28
8
30
8
26
24
28
6
2

PROTECTIVE ENCLOSURE FOR SPLICE CONNECTION

BACKGROUND OF THE INVENTION

The present invention relates to a protective enclosure for a splice connection between respective wires of two cables.

There are many situations in which it is necessary to directly connect, or splice, the wires of one cable to respective wires of another cable, in which case the individual dual splice connections must be electrically insulated from one another and fron the external environment. As a result, a wide variety of arrangements for producing this result have already been proposed. Many such proposals include the use of heat-shrinkable tubing of electrical insulating material which is placed around each splice connection and then heated to be firmly secured to the insulation associated with the connected wires while enclosing the connection itself with a layer of electrical insulating material.

However, situations exist where the use of such tubing, by itself, is inadequate. This is the case, for example, when it is necessary to splice the conductors of a mineral insulated hardline cable to those of an organic softline cable in a nuclear power plant containment structure. The environmental, aging, accident and postaccident conditions for which provisions must be made in such an installation impose requirements which cannot be met simply by the use of heat-shrinkable tubing, or by other known splice enclosure solutions.

In such an installation, it is necessary that the spliced conductor ends be insulated against beta radiation, which is the major cause of material degradation. At the same time, the region in which the cables are connected together should be flexible and it should be possible to make such a splice connection in situ.

SUMMARY OF THE INVENTION

It is an object of the present invention to provide a novel protective enclosure for such a splice connection which permits the above-mentioned objectives to be achieved to a greater extent than that permitted by known splice enclosing structures.

A more specific object of the invention is to provide a protective enclosure which offers maximum beta radiation shielding for the conductor portions which have been exposed to enable the splice connections to be made.

Another specific object of the invention is to provide an enclosure which can be installed in situ.

Yet another object of the invention is to provide an enclosure which is sufficiently flexible to permit the necessary manipulation of the cables subsequent to splicing.

The above and other objects are achieved, according to the present invention, by the provision of a novel protective enclosure for a splice connection between respective conductors of a hardline cable having a rigid sheath and a softline cable having a flexiblle sheath, each conductor including a conductive wire and a layer of insulation enclosing the wire, with one wire of the hardline cable being electrically connected to a corresponding wire of the softline cable by a connector located in a splice region, the enclosure comprising:

cover means extending between, and secured to, the cable sheaths and including a flexible metal tube enclosing the splice region; and a mass of flexible potting material filling the splice region for isolating the connector and the wires connected thereby from the external environment.

According to preferred embodiments of the invention, the flexible metal tube is of stainless steel and is provided with annular corrugations to impart the desired flexibility. The mass of flexible potting material can be of any suitable composition providing the necessary environmental isolation, potting material sold under the trademark Silastic or under the trademark Dow Corning 738 Sealant being suitable.

In further accordance with preferred embodiments of the invention, the flexible metal tube is connected to the hardline cable sheath by means of a conventional reducing union and a stainless steel potting adapter, the interior of the reducing union and of the adapter also being filled with the potting material.

To assure proper electrical insulation between spliced conductors, each splice is additionally enclosed by a length of heat-shrinkable insulating tubing.

In further accordance with the invention, a further length of heat-shrinkable tubing is placed around the flexible metal tube and extends from a location close to the reducing union to the flexible sheath of the softline cable.

BRIEF DESCRIPTION OF THE DRAWING

The sole FIGURE is a longitudinal view, partly in cross section, of a preferred embodiment of a protective enclosure according to the invention.

DESCRIPTION OF THE PREFERRED EMBODIMENTS

The FIGURE shows one embodiment of a splice enclosure according to the present invention for a splice between a hardline cable having a stainless steel sheath 2 and a softline cable having a flexible sheath 4. Secured to sheath 2 is a potting adapter 6 which is also made of stainless steel and which is brazed to sheath 2. Preferably, the interior of potting adapter 6 is preliminarily filled with potting material to assure complete sealing of the splice region. The illustrated embodiment is based on a two-conductor cable, although it will be appreciated that the invention can be applied to cables having any number of conductors.

The hardline cable includes two conductors composed of insulation 8 enclosing wires 10, while the softline cable contains two conductors having insulation 12 surrounding wires 14. Insulation 8 and 12 is stripped from the ends of wires 10 and 14 in the staggered manner shown in the FIGURE to provide additional room for the components of the splice enclosure. Each pair of wires 10 and 14 is spliced together by a mechanical splice 16, which may be a parallel splice of the type sold under the trademark AMP. Each pair of wires 10, 14 is attached together by squeezing the associated splice 16 to form a secure mechanical and electrical connection.

The region of each splice is enclosed by a length of flexible shrink tubing 18, each tubing 18 covering the ends of the associated insulation 8 and 12 and being shrunk to fit tightly therearound. Each piece of shrink tubing 18 also fits tightly around the associated splice to provide additional mechanical support therefor.

The splice region is enclosed by a stainless steel tube 20 which is corrugated, as shown, to be flexible. Tube 20 is provided with a potting hole 22, the purpose of which will be described below.

Associated with potting adapter 6 is a spring 24 which projects axially out of adapter 6 and surrounds the hardline cable wire insulation 8.

Flexible tube 20 is secured to the hardline cable by means of a reducing union composed of a reducing union body 26 and reducing union nuts 28. The reducing union may be of a conventional type, such as those sold under the trademark Swagelok. By way of example, a Swagelok reducing union sold under the Catalog No. 600-6-4 can be used, with the smaller diameter end of the reducing union being connected to potting adapter 6 and the larger diameter end being connected to flexible tube 20. After the reducing union has been assembled, as shown in the FIGURE, with potting adapter 6 and flexible tube 20 secured in reducing union body 26 by means of nuts 28, a suitable potting material is injected into the interior of flexible tube 20 via potting hole 22. By way of example, the potting material could be introduced from a sealant cartridge sold under the trademark dow Corning 738. Sufficient potting material is introduced to completely fill all of the spaces in the region enclosed by flexible tube 20, including the region enclosed by the reducing union, up to the potting adapter 6.

Subsequent to introduction of potting material 30, a further length of shrink tubing 32 is placed around flexible tube 22 to extend from a point adjacent reducing union nut 28 to a point beyond the right-hand end of flexible tube 20 so as to cover a portion of sheath 4. Tube 32 is positioned to cover potting hole 22. After tube 32 has been shrunk, it tightly encloses the end of flexible tube 20 which is directed toward the reducing union and a portion of sheath 4.

Before forming the assembly shown in the FIGURE, wires 10 and 14 and their associated insulations 8 and 12 already extend a certain length from the ends of their associated sheaths 2 and 4 and the wires are cut and stripped to produce the staggered wire arrangements illustrated.

Then, shrink tubing 32, which has not yet been shrunk, is slipped over sheath 4 to a position remote from the splice location. Then, the left-hand end of flexible tube 20 is inserted into reducing union body 26 and the right-hand nut 28 until the leading edge of tube 20 abuts against an internal shoulder provided in body 26. The right-hand nut 28 is then tightened onto body 26 in order to pre-swage nut 28 to tube 20. Thereafter, nut 28 is removed from body 26 while flexible tube 20 remains secured in the nut. Thereafter, flexible tube 20 and its associated nut 28 are slipped over sheath 4 to a position remote from the splice region.

In a similar manner, left-hand nut 28 is preswaged to potting adapter 6, whose interior was previously filled with potting material, so that the end of adapter 6 abuts against a second shoulder at the interior of reducing union body 26. Left-hand nut 28 is left in place on reducing union body 26.

If the end of potting adapter 6 must be positioned in body 26 at a location other than that defined by the second shoulder, body 26 can be drilled through to have a minimum diameter equal to that of the region receiving adapter 6, thereby eliminating the second shoulder.

Then, one shrink tubing 18 is slipped over the longer one of the two wires 10, 14, with which it is associated, to a position spaced from the region where the splice will be produced. Each pair of wires to be joined together is then inserted into a respective splice 16, which is squeezed to produce the desired mechanical and electrical connection.

The two pieces of shrink tubing 18 are then moved into the positions shown in the FIGURE and heated to establish the final configuration illustrated.

For the potting operation, the cavity in reducing union body 26 is first filled with sealant material, this sealant being introduced via the right-hand end of body 26. Then, tube 20 with its connected nut 28 is moved toward reducing union body 26. At this point, if desired, tube 20 can first be moved to a position where its left-hand end is a short distance from reducing union body 26 and sealant material can be injected into the left-hand end of tube 20, preferably until sealant material can be seen through potting hole 22.

Thereafter, flexible tube 20 is inserted into reducing union body 26 and the associated nut 28 is tightened thereon to establish the assembled relation illustrated in the Figure.

At this point, the remainder of the interior of flexible tube 20 is filled with potting material 30, injected via potting hole 22, after which nuts 28 can be fully tightened.

To establish the desired sealing and insulating properties, the sealant material described above must be cured for a period of the order of seven days or longer. If a different type of sealant material is used, a different curing time appropriate to that material will be employed.

Subsequent to curing, shrink tubing 32 is slipped over flexible tube 20 to the position illustrated in the Figure and then heated to shrink it to the final configuration illustrated.

In the arrangement shown in the Figure, the length of flexible tube 20 is sufficient to allow the right-hand end thereof to enclose the left-hand end of sheath 4. If flexible tube 20 does not extend to sheath 4, then the arrangement shown in the Figure can be modified by the provision of an additional length of shrink tubing extending between, and covering, the right-hand end of tube 20 and the left-hand end of sheath 4, and shrink tubing 32 is made long enough to also enclose a region at the left-hand end of sheath 4.

It will be understood that the above description of the present invention is susceptible to various modifications, changes and adaptations, and the same are intended to be comprehended within the meaning and range of equivalents of the appended claims.

We claim:

1. In a nuclear power plant containment structure including: a hardline cable composed of a rigid sheath and at least one conductor enclosed by the rigid sheath and including a first conductive wire and a layer of insulation enclosing the first conductive wire; a softline cable composed of a flexible sheath and at least one conductor enclosed by the flexible sheath and including a second conductive wire and a layer of insulation enclosing the second conductive wire; a connector establishing a splice connection electrically and mechanically connecting the first and second conductive wires together; and a protective enclosure surrounding the connector, the improvement wherein said protective enclosure comprises:

cover means extending between, and secured to, said rigid sheath and said flexible sheath, said cover means including a flexible stainless steel tube enclosing said connector and provided with axially spaced annular corrugations which impart flexibility to said tube, and a reducing union connecting said flexible tube to said rigid sheath;

a mass of flexible potting material surrounding said connector, filling the interior of said reducing union and enclosed by said flexible tube for isolating said connector and said first and second conductive wires from the external environment;

a first length of tubing of a heat-shrinkable material surrounding said connector and extending to said layers of insulation enclosing said first and second conductive wires, said first length of tubing being heat shrunk to conform closely to said layers of insulation; and a second length of tubing of a heat-shrinkable material surrounding said flexible tube and being heat shrunk to conform closely to said flexible tube.

2. A structure as defined in claim 1 wherein said metal tube is provided with a potting hole for introduction of said potting material.

3. A structure as defined in claim 1 wherein said cover means further comprises a potting adapter secured to the rigid sheath and fastened in said reducing union.

4. A structure as defined in claim 3 wherein said potting adapter has a hollow interior filled with said potting material.

5. A structure as defined in claim 1 wherein said second length of tubing additionally encloses, and conforms closely to, said flexible sheath.

* * * * *